Patented May 5, 1936

2,039,743

UNITED STATES PATENT OFFICE 2,039,743

INFUSIBLE MOLDED PRODUCT

Samuel E. Sheppard, Rochester, N. Y., assignor to Eastman Kodak Company, Rochester, N. Y., a corporation of New York No Drawing. Application June 5, 1934, Serial No. 729,090

6 Claims. (Cl. 18—48)

This invention relates to infusible molded products, and more particularly to such products derived from cellulose esters. One object of my invention is to provide infusible molded products by the vulcanization of unsaturated aliphatic acid esters of cellulose. Other objects will hereinafter appear.

It is known that molded objects may be prepared from cellulose acetate by molding compositions of it with certain cellulose acetate plasticizers. Such molded articles have the property, which for many purposes is an advantage, of being thermoplastic. However, for certain uses in which the molded article is to be subjected to high temperatures, it is necessary that it should not be liable to change its form under these elevated temperatures: that is to say, after the molding operation is completed, the article should be infusible.

I have discovered that infusible molded products can be made by vulcanizing cellulose esters of unsaturated aliphatic acids, such, for example, as cellulose crotonate, cellulose acetate-crotonate, cellulose oleate, and cellulose acetate-oleate, by heating under pressure with sulfur and a vulcanization accelerator. It will be noted that the cellulose ester may contain the radical of a saturated aliphatic acid, as well as the radical of the unsaturated aliphatic acid. The vulcanization accelerators which I may use are any of the known accelerators for the vulcanization of rubber, such, for instance, as zinc dimethyl dithiocarbamate, hexamethylene tetramine, etc.

In carrying out my invention, I prepare an intimate mixture of the cellulose ester with finely divided sulfur and the accelerator. If desired, I may add fillers, pigments or dyes of types which are not adversely affected by vulcanization, many of which are known in the rubber art. I may also add cellulose esters of saturated aliphatic acids, with or without plasticizers, to an extent which does not render the molded product thermoplastic.

An additional advantage of my novel, infusible molded products is that after molding they may be removed immediately from the mold while hot, thus avoiding the trouble and expense of chilling the mold.

As an illustration of the way in which my invention may be carried out, I give the following example, but it will be understood that I am not to be limited thereby except as indicated in the appended claims.

Example: An intimate mixture of

| | Grams |
|---|---|
| Cellulose crotonate | 17 |
| Sulfur | 3 |
| Zinc dimethyl dithiocarbamate (commercially known as Zymase) | 0.2 to 8 | is heated to 150 degrees C.–180 degrees C. at a pressure of 6000 lbs./sq. in. for 10 minutes. The molded article is removed from the mold while still hot.

What I claim as my invention and desire to be secured by Letters Patent of the United States is:

1. An infusible molded product comprising a vulcanized cellulose aliphatic ester, free from cyclic radicals and containing an unsaturated aliphatic acid radical.

2. An infusible molded product comprising a vulcanized cellulose aliphatic mixed ester, free from cyclic radicals and containing an unsaturated aliphatic acid radical and a saturated aliphatic acid radical.

3. An infusible molded product comprising vulcanized cellulose crotonate.

4. An infusible molded product comprising vulcanized cellulose acetate-crotonate.

5. An infusible molded product comprising vulcanized cellulose oleate.

6. A process of preparing an infusible molded product by heating, under pressure, an intimate mixture of sulfur, a vulcanization accelerator, and a cellulose aliphatic ester, free from cyclic radicals and containing an unsaturated aliphatic acid radical.

SAMUEL E. SHEPPARD.